US009604728B2

(12) United States Patent
Fabre et al.

(10) Patent No.: US 9,604,728 B2
(45) Date of Patent: Mar. 28, 2017

(54) AIRCRAFT TURBOJET NACELLE (71) Applicant: AIRBUS OPERATIONS (SAS), Toulouse (FR)

(72) Inventors: Christian Fabre, Tournefeuille (FR); Alain Bignolais, Leguevin (FR)

(73) Assignee: Airbus Operations (S.A.S.), Toulouse (FR)

( * ) Notice: Subject to any disclaimer, the term of this patent is extended or adjusted under 35 U.S.C. 154(b) by 393 days.

(21) Appl. No.: 14/275,260

(22) Filed: May 12, 2014

(65) Prior Publication Data
US 2014/0334922 A1    Nov. 13, 2014

(30) Foreign Application Priority Data
May 13, 2013   (FR) ...................................... 13 54260

(51) Int. Cl.
F01D 25/24    (2006.01)
B64D 29/08    (2006.01)
(52) U.S. Cl.
CPC .................................... B64D 29/08 (2013.01)
(58) Field of Classification Search
CPC ................................................... B64D 29/08
See application file for complete search history.

(56) References Cited
U.S. PATENT DOCUMENTS

| 3,347,578 | A | 10/1967 | Sheehan et al. | |
| 5,350,136 | A * | 9/1994 | Prosser | B64D 29/08 244/118.2 |
| 6,334,730 | B1 * | 1/2002 | Porte | B64D 29/08 244/129.5 |
| 7,703,716 | B2 * | 4/2010 | Bulin | B64D 29/06 244/129.4 |
| 8,956,109 | B2 * | 2/2015 | Regard | B64D 29/08 415/126 |
| 2008/0072572 | A1 * | 3/2008 | Beutin | B64D 29/08 60/246 |
| 2011/0250054 | A1 * | 10/2011 | Pereira | B64D 29/08 415/126 |
| 2013/0294900 | A1 * | 11/2013 | Graily | F01D 25/145 415/177 |

(Continued)

FOREIGN PATENT DOCUMENTS

FR    886 174    10/1943

OTHER PUBLICATIONS

Translation of FR886174 Specification.*
French Search Report dated Jan. 15, 2014 in FR 1354260, 7 pages.

Primary Examiner — Jesse Bogue
(74) Attorney, Agent, or Firm — Nixon & Vanderhye P.C.

(57) ABSTRACT

The invention relates to an aircraft turbojet nacelle including a cowling assembly (60) made up of four covers (62, 64, 66, 68). Each cover extends in arcuate shape around part of the longitudinal axis of the nacelle, in symmetrical manner about a vertical plane (P) containing the axis. On either side of said plane, the cowling assembly comprises a top cover (62, 66) hinged at its top portion and a bottom cover (64, 68) hinged at its bottom portion. Access to the internal space (e) of the nacelle is obtained by moving the covers away from the longitudinal axis by pivoting them about their hinge axes. A top cover is less heavy for handling purposes than is a single cover of the prior art.

15 Claims, 6 Drawing Sheets (56) References Cited

U.S. PATENT DOCUMENTS

| | | | |
|---|---|---|---|
| 2014/0234090 A1* | 8/2014 | Hurlin | B64D 29/06 |
| | | | 415/182.1 |
| 2014/0301835 A1* | 10/2014 | Popescu | B64D 29/08 |
| | | | 415/182.1 |
| 2015/0110613 A1* | 4/2015 | Aten | B64C 7/02 |
| | | | 415/182.1 |
| 2015/0308291 A1* | 10/2015 | Brown | B64D 29/08 |
| | | | 415/182.1 |
| 2016/0264233 A1* | 9/2016 | Pautis | B64D 29/08 |

* cited by examiner

AIRCRAFT TURBOJET NACELLE

This application claims priority to France Application No. 1354260 filed on May 13, 2013, the entire content of which is hereby incorporated by reference.

The invention relates to an aircraft turbojet nacelle.

In general, aircraft turbojet nacelles include a cowling assembly that, in a closed position, covers elements that are inside the nacelle (fan, engine, . . . ), and, in an open position, gives access to those elements, e.g. for maintenance purposes.

Turbojet nacelles in which the air inlet is coaxial with the fan, referred to as turbofan nacelles, are fitted in particular with such a cowling assembly.

Figure 1A:
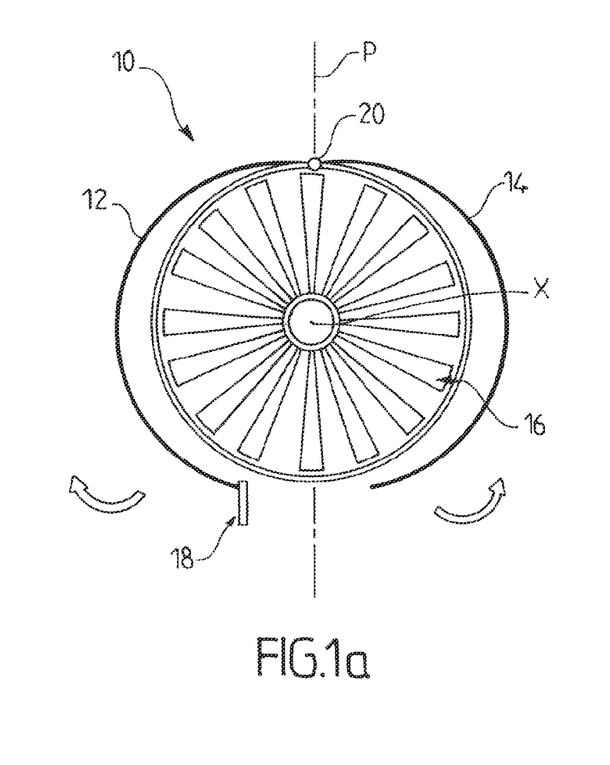
FIGS. 1a and 1b are diagrammatic views of a prior art cowling assembly for a jet engine nacelle, respectively while being opened, and in the open position.
Figure 1B:
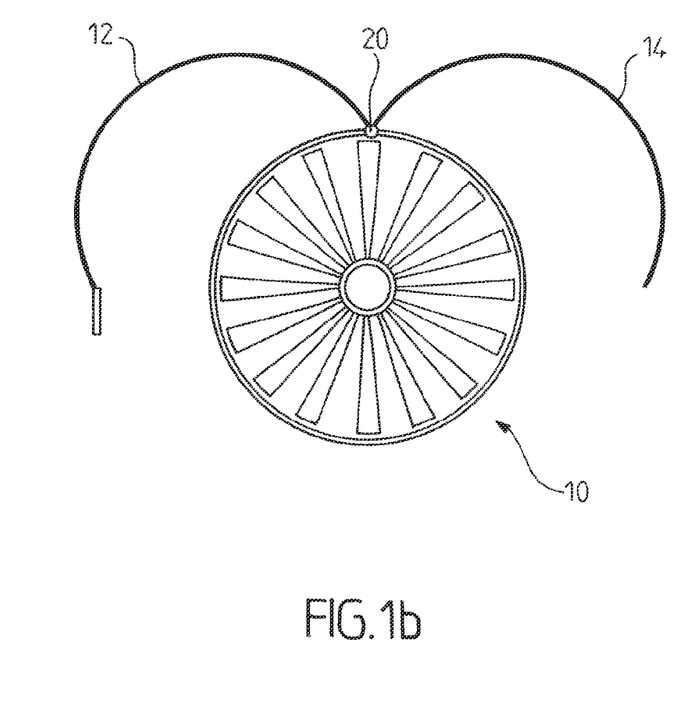

A prior art cowling assembly 10 for a turbofan nacelle is shown in front view in FIGS. 1a and 1b with the assembly being in an open position.

The cowling assembly 10 comprises two arcuate half-covers 12 and 14 that are symmetrical about a vertical plane P (when the aircraft is on the ground) containing the horizontal longitudinal central axis X of the nacelle on which the fan 16 is centered.

The two half-covers 12 and 14 are locked together in the closed position of the cowling assembly 10 by means of a locking system 18.

The two half-covers 12 and 14 are hinged at their top portions by means of a hinge system 20 having a hinge axis arranged in the vertical plane of symmetry, parallel to the longitudinal central axis X. The two half-covers can thus open upwards by pivoting about the hinge system 20, represented by arrows in FIG. 1a.

Nevertheless, turbofan type jet engines are generally of large diameter, e.g. having a diameter of about 3 meters, and consequently the weight of the covers can be considerable. The task of opening such half-covers is normally performed by maintenance personnel with the assistance of actuators.

Nevertheless, it can happen that maintenance personnel need to provide manual assistance in performing the opening movement of the half-covers, and that is found to be a task that is difficult, given their weight.

Thus, in a first aspect, the present invention provides an aircraft turbojet nacelle of generally elongate shape extending around and along a longitudinal central axis, the nacelle including a cowling assembly that is pivotally movable between a closed position and an open position, with the cowling assembly in the closed position defining an internal space that extends radially around said axis and parallel thereto, the transition from the closed position to the open pivoted position being obtained by moving the cowling assembly radially away from the longitudinal central axis in order to give access to said internal space, the nacelle being characterized in that the cowling assembly comprises four covers, each extending in arcuate shape around part of the longitudinal central axis and in a manner that is symmetrical about a vertical plane containing the longitudinal central axis, the cowling assembly comprising on either side of said plane a top cover hinged at its top portion and a bottom cover hinged at its bottom portion, the arcuate shape of the bottom cover extending in cross-section over an arc of length that is shorter than the length of the arc of the top cover.

The cowling assembly has four covers for surrounding the nacelle and covering its internal elements instead of two half-covers as in the prior art, thus making it possible for each of the four covers to be lighter in weight than each half-cover. Thus, maintenance personnel find the task of assisting the opening of the covers easier than in the prior art.

According to other possible characteristics taken in isolation or in combination with one another:
  the length of the arc of each bottom cover is arranged so that its free end lies under the nacelle when said bottom cover is open;
  the bottom cover extends in arcuate shape from a fixed first end that is hinged to an opposite second end that is free and that is firstly arranged at a height that is higher than the height of the first end when the bottom cover is in the closed position, and that is also arranged at a height that is lower than the height of the first end when the bottom cover is in the open position;
  each of the two bottom covers is hinged about a pivot axis lying in the vertical plane of symmetry or in the proximity of said plane;
  each of the two top covers is hinged about a pivot axis that is disposed in the vertical plane of symmetry or in the proximity of said plane;
  the nacelle includes locking means for locking each top cover with the bottom cover situated on the same side of the vertical plane of symmetry; and
  at least one of the two bottom covers is shielded, in particular to withstand debris projected from the other nacelle having a facing bottom cover.

In a second aspect, the invention provides an aircraft including at least one nacelle in accordance with the first aspect of the invention and in which each bottom cover extends in arcuate shape from a fixed first end that is hinged to an opposite second end that is free, such that the difference in height between the height of the fixed first end of said open bottom cover and the height of its free second end when the aircraft is standing on the ground and at least one of the two bottom covers is in the open position, is equal to the difference in height between the height of said first end and the ground.

According to other possible characteristics taken in isolation or in combination with one another:
  the length of the arc of each bottom cover is determined while taking account of the difference in height between the height of the first end and the ground;
  the aircraft has a central fuselage and two jet engine nacelles arranged on either side of the central fuselage;
  each of the two jet engine nacelles has a bottom cover facing towards the fuselage, and said nacelles are arranged relative to the central fuselage in such a manner that said respective bottom covers are arranged at least in part at a height lower than the height of the lowest portion of the fuselage that is situated between the two nacelles; and
  each of the two bottom covers that face each other at least in part is shielded in order to withstand debris projected from the other nacelle having the facing bottom cover.

Other characteristics and advantages appear from the following description given purely by way of non-limiting example and made with reference to the accompanying drawings, in which.

Figure 2:
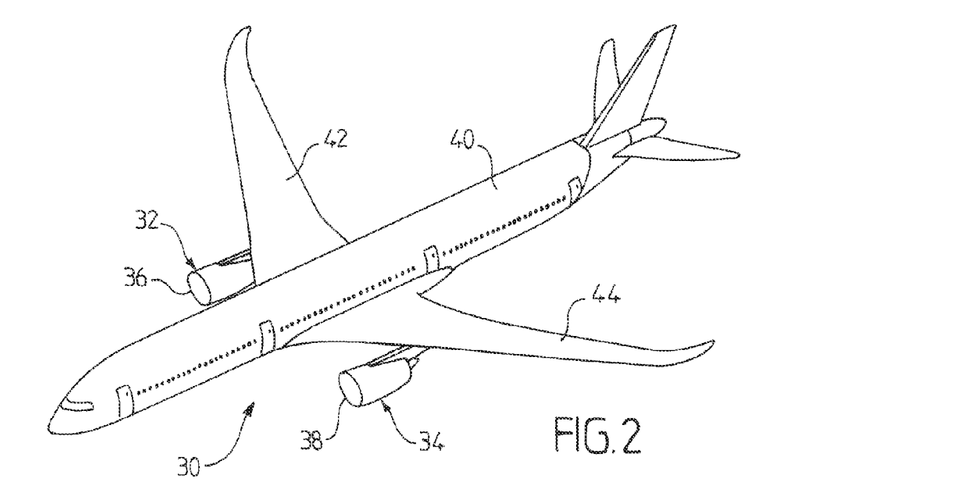
FIG. 2 is a diagrammatic general view of an aircraft including two jet engine nacelles in an embodiment of the invention.

As shown diagrammatically in FIG. 2 and given overall reference 30, an aircraft in the embodiment of the invention has two propulsion units 32 and 34.

Each propulsion unit 32 and 34 has a respective jet engine nacelle 36 and 38 with a turbojet inside the nacelle and not visible in the figure.

The aircraft 30 also has a fuselage 40 with two wings 42 and 44 connected thereto constituting the wings of the aircraft. The two propulsion units 32 and 34 are secured under respective ones of the wings 42 and 44.

Figure 3:
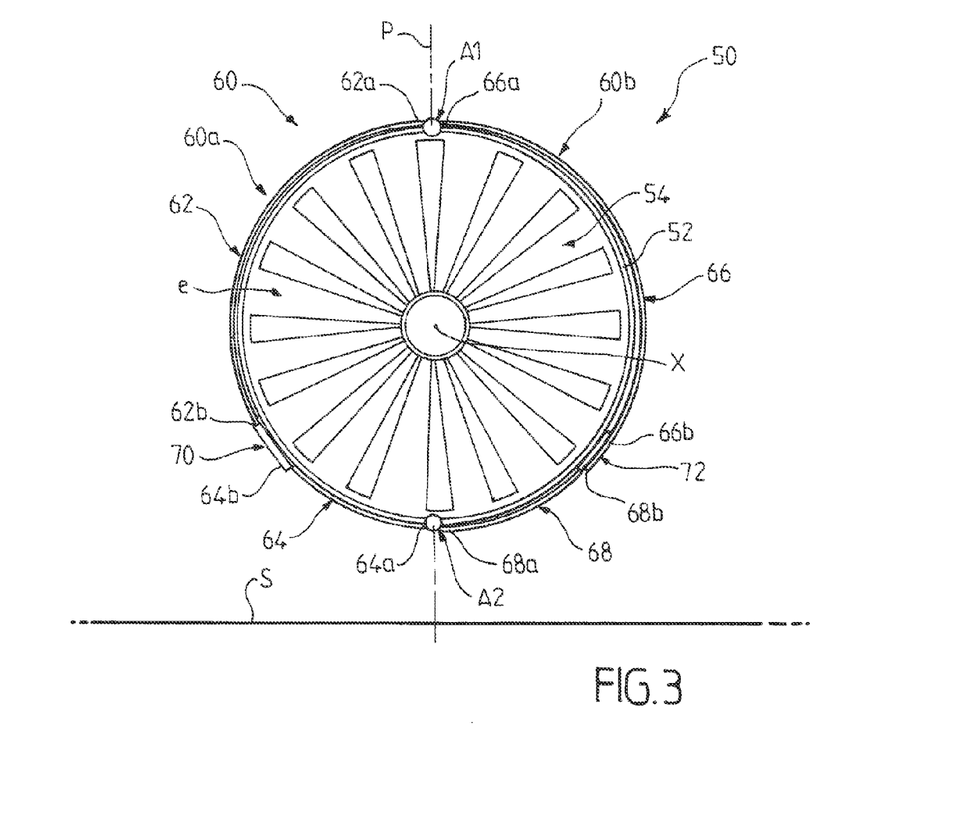
FIG. 3 is a diagrammatic general view of a jet engine nacelle including a cowling assembly in an embodiment of the invention shown in the closed position.

FIG. 3 is a front view of the nacelle 50 of one of the two propulsion units 32 and 34 while the aircraft is standing on the ground. The nacelle 50 is generally elongate in shape, extending along a longitudinal central axis X and around that axis. The longitudinal central axis is parallel to the longitudinal axis of the fuselage 40 of the aircraft. The nacelle has an internal fairing 52 surrounding the fan 54 of the propulsion unit and an external cowling assembly 60 that, in the closed position, covers the internal fairing 52. The internal fairing and the fan are both centered on the axis X. The air inlet into the nacelle is coaxial with the fan 54. It should be observed that the cowling assembly 60 is arranged close to the front end of the nacelle.

More particularly, the cowling assembly 60 comprises four independent covers 62, 64, 66, and 68, each having an arcuate shape (in the front view of FIG. 3 and also in cross-section), and together they extend all around the circumference of the nacelle so as to surround the internal fairing 52 completely when in the closed position of FIG. 3. In conventional manner, the cowling assembly extends between the end of the air inlet and the beginning of the thrust reversal.

The cowling assembly 60 is arranged on the nacelle symmetrically about the longitudinal vertical plane P containing the longitudinal central axis X and subdividing both the nacelle and the turbojet into two equal portions lengthwise.

Thus, the cowling assembly 60 has a left cowling half-assembly 60a and a right cowling half-assembly 60b arranged on either side of the vertical plane of symmetry P, where the terms "left" and "right" are used relative to the drawing sheets.

The left cowling half-assembly 60a comprises an arcuate top cover 62 hinged at its top portion via a hinge mechanism to pivot about a first pivot axis parallel to the axis X and an arcuate bottom cover 64 hinged at its bottom portion by a hinge mechanism to pivot about a second pivot axis parallel to the axis X.

The right cowling half-assembly 60b comprises an arcuate top cover 66 hinged at its top portion by a hinge mechanism to pivot about a third pivot axis parallel to the axis X, and an arcuate bottom cover 68 hinged at its bottom portion by a hinge mechanism to pivot about a fourth pivot axis parallel to the axis X.

To simplify the following explanations, the first and third pivot axes are represented by a single pivot axis A1 and the second and fourth pivot axes are represented by a single pivot axis A2.

Nevertheless, the first and second pivot axes do not necessarily coincide but may be arranged in parallel and spaced apart from each other on either side of the plane P. By way of example, such an arrangement accommodates the presence of the structure of the mast that serves to connect the propulsion unit to the structure of the wing (not shown) that is situated above it. The first and third axes are thus arranged on either side of the plane of symmetry P, and close thereto. The second and fourth pivot axes do not necessarily coincide, and they may be arranged in parallel and spaced apart from each other on either side of the plane P. Nevertheless, they may coincide, as shown at A2, lying in the plane P in order to accommodate installation constraints.

Each top and bottom cover 62 and 66 or 64 and 68 of each of the two cowling half-assemblies 60a and 60b extends in arcuate shape (forming a portion of a circle in FIG. 3) over a fraction of the circumference of the nacelle from a fixed first end 62a, 66a or 64a, 68a hinged about the pivot axis of the cover to an opposite second end 62b, 66b or 64b, 68b that is free. The two free ends 62b, 64b of the top covers and the two free ends 66b, 68b of the bottom covers meet and they are fastened together in the closed position by respective left and right locking means 70 and 72 of conventional type.

In cross-section, each top cover 62, 66 extends over an arc of length greater than the arc of each bottom cover (and thus over more than 90°, but less than 180°). The total length of the two arcs is substantially equal to 180°. The top cover thus extends substantially from a top zone situated on or close to the plane P and going down to a side zone of the nacelle situated below a horizontal or equatorial plane containing the axis X (FIG. 3). In general manner, the lengths of the arcs of the various covers depend on several parameters such as the diameter of the fan, the space available between the bottom portion of the nacelle and the ground, and needs to access particular pieces of equipment.

Thus, the locking means 70 and 72 are situated on each of the two opposite sides or flanks of the nacelle in a lateral outside zone of the nacelle that is easily accessible for personnel optionally performing maintenance in a zone situated under the nacelle, under the longitudinal axis X, as in the prior art.

As shown in the closed position in FIG. 3, the cowling assembly 60 completely surrounds a radial space e inside the nacelle and extending around the longitudinal axis X and parallel thereto lengthwise along the cowling assembly.

The nacelle includes actuator means or actuators for opening and closing the cowling assembly 60 on command. Such means are provided on each side of the nacelle for each of the left and right cowling half-assemblies for the purpose of moving the top covers 62 and 66 from the closed position to the open position pivoted away from the central axis X. It should be observed that insofar as the weight of the cowling assembly 60 is reduced compared with the prior art, for a given diameter of nacelle the actuators may be smaller in size than in the prior art. The bottom cowling assembly does not require actuators to be installed in order to open it because of the small size of the covers and because of their accessibility.

Figure 4:
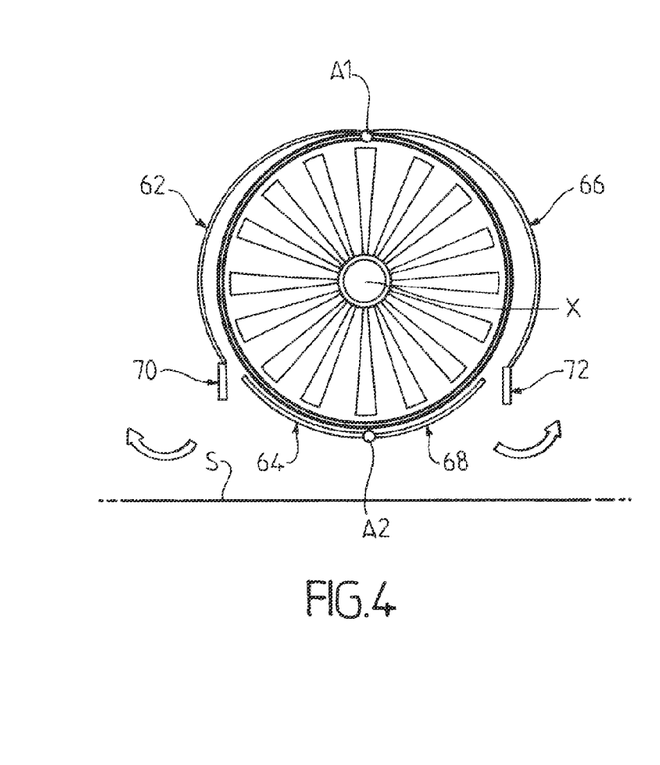
FIGS. 4 to 6 are diagrams showing the movements involved in opening the FIG. 3 cowling assembly.

FIG. 4 shows the beginning of opening the cowling assembly 60, and more particularly of upwardly pivoting the two top covers 62 and 66 in the directions indicated by the arrows, after the associated locking means 70 and 72 have been unlocked. The bottom covers 64, 68 may remain in the closed position if the maintenance operation relates only to elements situated in the top portion of the nacelle, or they may be opened at the same time. Devices, not shown, serve to hold the bottom covers 64, 68 in the closed position even after the means 70, 72 have been unlocked. It should be observed that the top covers 62, 66 may be opened independently of each other. The bottom covers can be unlocked only after the top covers 62, 66 have been opened, however they can be opened independently of each other.

Figure 5:
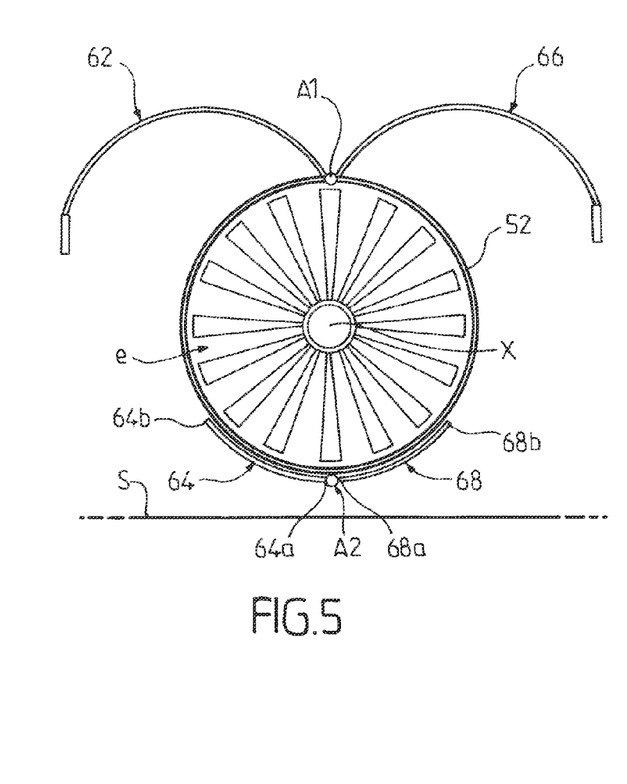

FIG. 5 shows the two top covers 62, 66 at the end of their pivoting movement in the fully open position. The amplitude of this pivoting movement is defined by the stroke of the actuator means, which stroke is adjusted so that the top covers are raised until they reach predetermined high open positions. For example, the actuator means may be adjusted so that in the fully open position, the top covers do not interfere with the wing situated above them.

In this position of the cowling assembly (a partially open position), access is made possible to the top portion of the radial space e.

Figure 6:
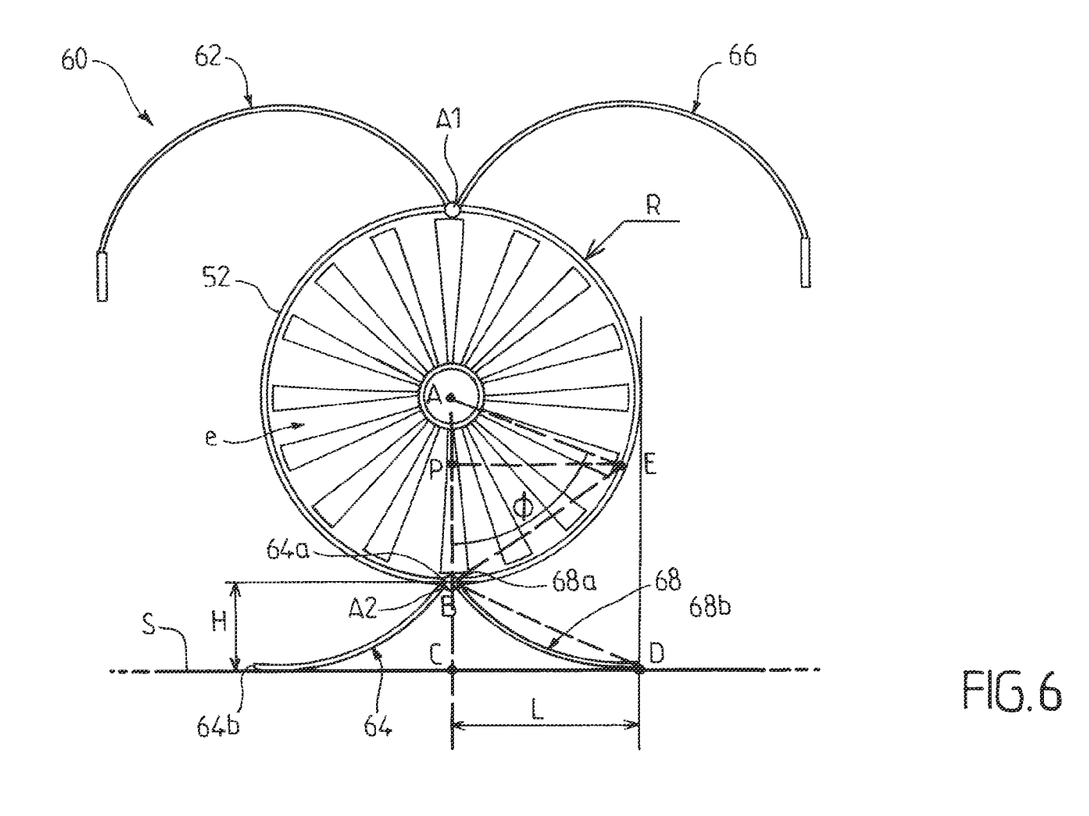

FIG. 6 shows the cowling assembly 60 in an open position that is obtained by downwardly pivoting the two bottom covers 64, 68 from the closed position of FIG. 5. The two bottom covers are thus moved away from the internal fairing 52 and the axis X so as to release access to the bottom portion of the radial space e.

In the open position of FIG. 6, the free end 64b, 68b of each bottom cover 64, 68 is arranged in contact with the ground S, at a height that is lower than the height of the corresponding opposite fixed end 64a, 68a of the cover. When the bottom covers 64, 68 are in the closed position of FIG. 5, their free ends 64b, 68b are at heights that are higher than the heights of the opposite fixed ends 64a, 68a.

As shown in FIG. 6, arcuate length of each bottom cover 64, 68 may be determined (at the design stage) so that the free ends 64b, 68b are always arranged below the nacelle when the bottom covers are open, i.e. so that the bottom ends do not project beyond the radial extent or width of the nacelle (and in particular of the internal fairing 52 of the nacelle). In other words, the free ends 64b, 68b, when in contact with the ground S, remain inside the ground area onto which the points of the nacelle are projected vertically.

Figure 7:
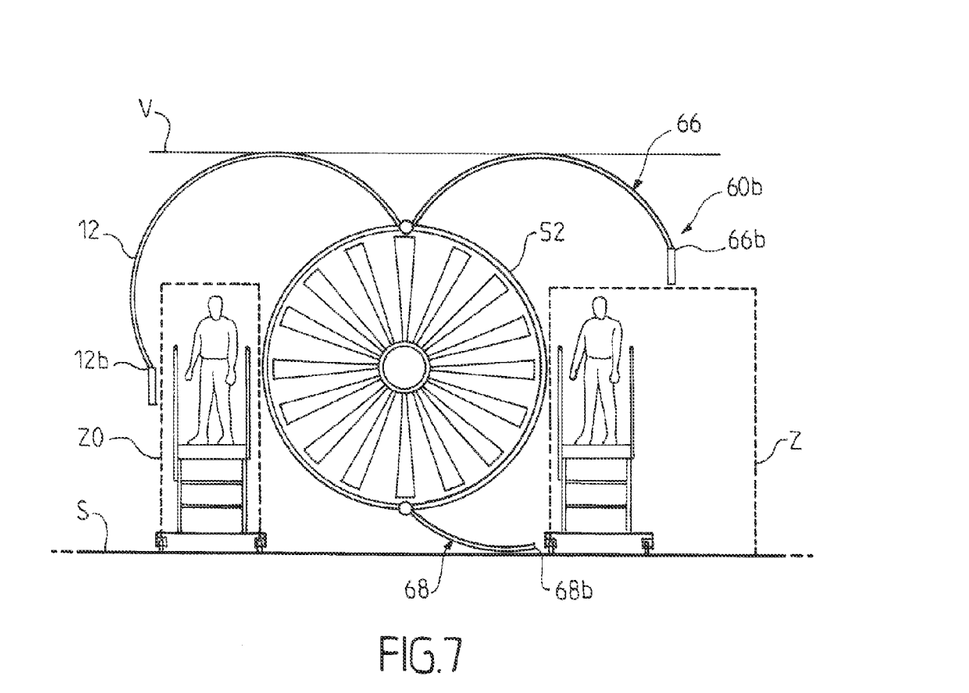
FIGS. 7 and 8 are diagrammatic composite views each showing, on a single jet engine nacelle, firstly on the right-hand side of the figure half of the FIG. 6 cowling assembly, and secondly on the left-hand side of the figure, half of the prior art cowling assembly of FIG. 1b.
Figure 8:
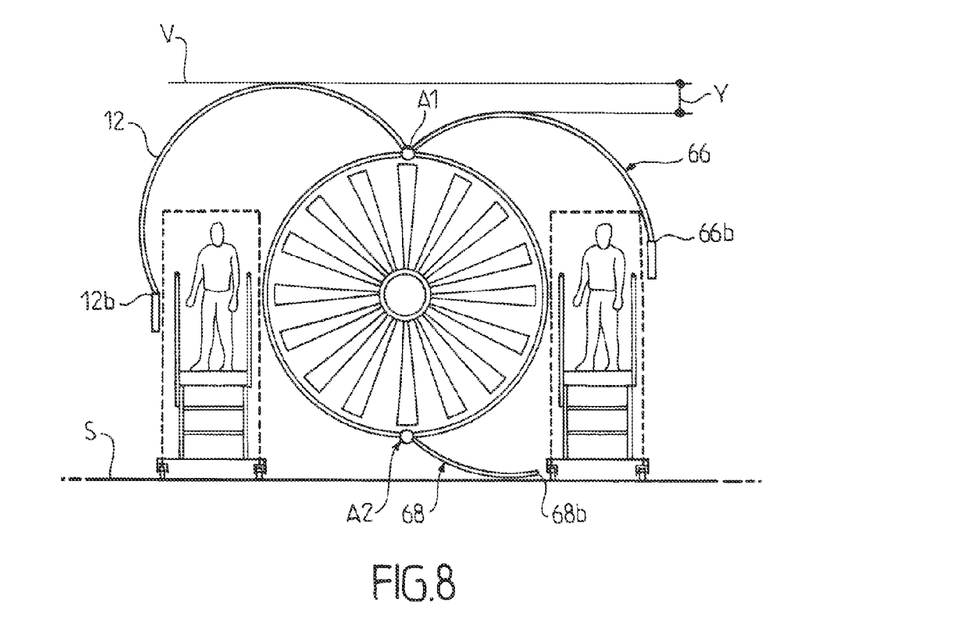

The advantages associated with this configuration are shown in FIGS. 7 and 8 and are described below.

This configuration leads to the following formula that is shown in FIG. 6 for the bottom right cover 68:

$$\cos(\phi) > (R^2 - H^2)/2R^2$$

where:

R is the radius of the nacelle;

H, also referred to as ground clearance, designates the difference in height between the height of the point B situated on the circumference of the nacelle where the hinged fixed end 68a is positioned, and the point D on the ground where the free end 68b is positioned; and φ is the angle or range of angles over which the bottom cover 68 extends between the point B situated on the circumference of the nacelle and where the hinged fixed end 68a is positioned, and the point E situated on the circumference of the nacelle and where the free end 68b is positioned when the cover is in the closed position as shown in FIG. 5. This angle defines the length of the arc over which the cover extends and it is determined so that the length L is less than the radius R, where the length L is the distance between the projection of the point B on the ground, written C, and the point D on the ground where the free end 68b is positioned.

The above formula is easily obtained from the following expressions while using as references, points A and B that are used only for intermediate calculations:

$$L < R$$

$$BE^2 = BD^2 = 2R^2(1 - \cos(\phi))$$

and $$BD^2 = H^2 + L^2$$

FIGS. 7 and 8 are both views of a fictitious nacelle made up firstly, on the left side of the figure, of the prior art left cowling half-assembly 12 as shown in FIG. 1b, and secondly on the right side of the figure, of the right cowling half-assembly 60b as shown in FIG. 6. The wing is represented symbolically with reference V.

As shown on the right side of the FIG. 7, the adjusted length (L<R) of the arc of the bottom cover 68 (and thus the adjusted position of the free end 68b of the bottom cover 68 on the ground) makes it possible to avoid giving rise to hindrance on the ground that could prevent an operator gaining access to the internal space e of the nacelle. It is therefore possible to move a maintenance device or equipment right up to the nacelle without damaging the bottom covers.

Furthermore, a comparison with the left side of the figure emphasizes the large dimensions (in height and in width) of the access zone Z that are opened up using the cowling assembly 60 in the embodiment of the invention. For given pivoting amplitude of the two respective covers 12 and 66, the free end of the top cover 66 is higher than the free end 12b of the single cover 12. This arrangement releases a larger amount of radial or lateral space under the cover 66 (and thus around the open nacelle) between said cover and the internal fairing 52 compared with the radial space released by the arrangement of the raised single cover 12 (see the access zone referenced Z0 in the left portion of FIG. 7).

FIG. 8 shows another advantage of the cowling assembly 60 of the embodiment of the invention.

Given that the length of the arc over which the top cover 66 extends is shorter than the length of the arc of the single cover 12 (substantially equal to 180°), the top cover 66 may be raised through a pivoting movement of amplitude that is smaller than the amplitude of the pivoting movement of the single cover 12 in order to release the same access zone under each of the two covers. This amplitude of the pivoting movement is controlled by previously adjusting the actuator means appropriately.

Furthermore, since the top cover 66 extends over an angle that is smaller than that of the single cover 12 and since it is raised through a pivot amplitude that is smaller than that of the single cover, it reaches a height that is lower than that reached by the single cover. This difference in height is written Y in FIG. 8. This arrangement makes it possible to increase the distance between the wing situated above the nacelle and the top cover in its open position, and thus makes it possible to further reduce any risk of interfering with the wing when the cover is opened.

It should be observed that the cowling assembly in the embodiment of the invention is easier to open than in the prior art, in particular for the following reasons:

the locking means 70, 72 positioned on the opposite flanks of the nacelle are easier for maintenance personnel to access since they are no longer arranged under the nacelle as in the prior art (FIGS. 1a-b), which is a zone that is difficult to access because of the relatively short distance between the bottom edge of the nacelle and the ground; and each of the top and bottom covers is lighter than the single cover of the prior art, thereby making it easier to handle, in particular while opening, in the event of providing assistance in raising the top cover.

It should be observed that positioning the locking means on the opposite flanks of the nacelle also makes them easier to inspect visually.

Insofar as the four covers are mutually independent, only the cover that gives access to the element of the nacelle that is to be monitored and/or repaired needs to be opened. Thus, except in the closed position, there are no mechanical connections between the four covers.

Figure 9:
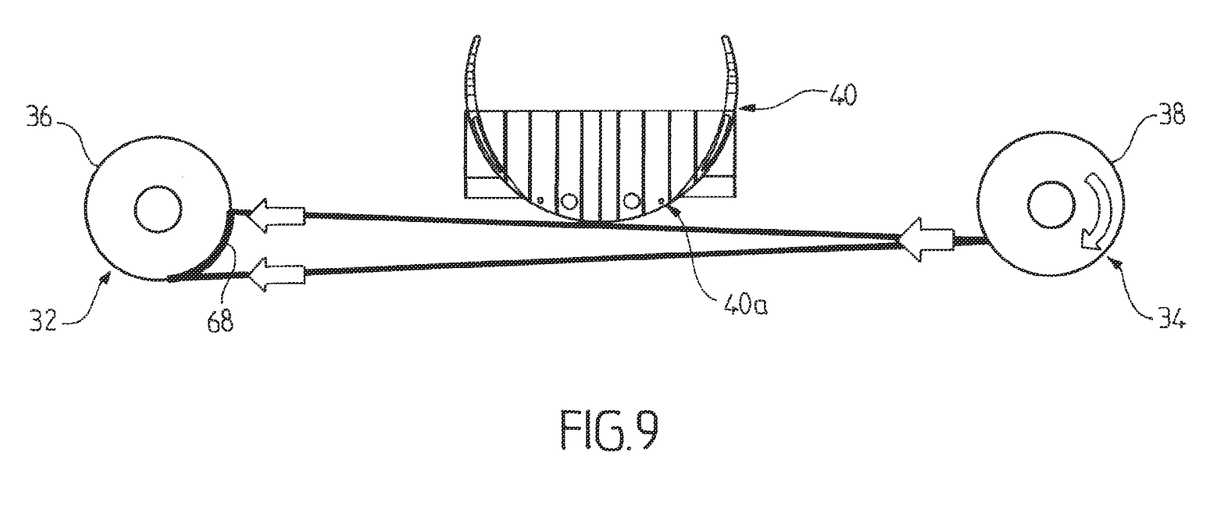
FIG. 9 is a diagrammatic front view of the bottom portion of the fuselage of the FIG. 2 aircraft with two nacelles situated on either side of the fuselage.

FIG. 9 shows a variant applied to the embodiment of the above-described figures and is a fragmentary front view of the FIG. 2 aircraft. In this figure, the wing and the top portion of the fuselage 40 are omitted and only the bottom cover 68 of one of the two nacelles 36 and 38 is shown.

In the arrangement shown in FIG. 9, the bottom covers of the two nacelles are arranged at a height that is lower than the height of the bottom portion 40a of the fuselage. Thus, the two bottom covers of the two nacelles that are respectively oriented towards the fuselage are arranged facing each other. Given this arrangement, any debris that might be projected by one of the propulsion units 32 or 34 in the event of it bursting might reach the other propulsion unit, thereby damaging equipment situated behind the cowlings (oil tank, pipework, . . . ).

In this variant, the two bottom covers of the cowling assembly 60 are reinforced mechanically. In other words, they are shielded so as to be more capable of withstanding any debris that might be projected by the other propulsion unit. By way of example, a shielded bottom cover may comprise over its entire surface a plate made of titanium or of fibers and that is dimensioned to be capable of absorbing the energy of a projected fragment coming from the opposite propulsion unit. The additional mass due to the shielding is carried only by the bottom cover, thereby not penalizing opening of the top cover.

FIG. 9 shows debris seen projecting from the propulsion unit 34 and reaching the bottom portion of the other propulsion unit 32. This debris reaching the right bottom cover 68 of the nacelle 36 lying on the trajectory of the debris, which cover, because of its mechanical reinforcement, serves to protect the nacelle and thus the propulsion unit mechanically from possible damage.

It should be observed that the aircraft may have more than two nacelles fitted with respective cowling assemblies 60 as described above, with or without one or two reinforced bottom covers per nacelle.

The arcuate lengths of the top cover and the bottom cover of each cowling half-assembly may be modified in correspondence with each other in other variant embodiments. Thus, the length of the arc of the bottom cover may be increased with the length of the top cover being correspondingly reduced, so that the total length substantially covers an arc of 180°. Nevertheless, depending on the expected size and accessibility constraints, the length of the arc of the bottom cover need not necessarily comply with the above-specified condition, namely L<R.

Conversely, the length of the arc of the top cover may be increased and the length of the bottom cover reduced correspondingly. However such an increase in length needs to be limited in order to avoid leading to a top cover that is too heavy.

It should be observed that in a variant, the combined length of the arc of the bottom and top covers may occupy an angle of less than 180°. By way of example, the bottom cover may thus be hinged about a pivot axis that is offset laterally from the plane P. Alternatively, it is possible for only a portion of the bottom cover to be hinged about a pivot axis that is offset laterally from the plane P. The remaining portion is fixed and covers the fraction of the circumference of the nacelle that lies between the pivot axis and the plane P.

The cowling assembly in the embodiment of the invention makes it possible to envisage using engines of greater diameter than in the prior art as a result of reducing the size of the covers.

The cowling assembly in the embodiment of the invention makes it possible to reduce the effects of scooping (air penetrating under the cover as a result of deformation of the leading edge and deflection of the covers) giving rise to an increase in forces on the structures (locking systems, hinges) that might be great enough to tear off the covers.

Certain pieces of equipment, such as an interphone connector may be installed on the bottom cover so as to be accessible regardless of the position of the covers.

The invention claimed is:

1. An aircraft turbojet nacelle of elongate shape extending around and along a longitudinal central axis, the aircraft turbojet nacelle comprising:
   a cowling assembly that is pivotally movable between a closed position and an open position, the cowling assembly in the closed position defining an internal space that extends radially around said longitudinal central axis and parallel thereto, the transition from the closed position to the open position being obtained by moving the cowling assembly radially away from the longitudinal central axis in order to give access to said internal space,
   wherein the cowling assembly comprises four covers each extending in arcuate shape around part of the longitudinal central axis and in a manner that is symmetrical about a vertical plane containing the longitudinal central axis,
   the cowling assembly comprising on either side of said plane at least one top cover hinged at its top portion and at least one bottom cover, hinged at its bottom portion, the arcuate shape of the at least one bottom cover extending in cross-section over an arc of length that is shorter than the length of the arc of the at least one top cover;
   wherein the at least one top cover comprises a first cover on one side of the vertical plane and a second cover on an opposite side of the vertical plane,
   wherein the at least one bottom cover comprises a third cover on the one side of the vertical plane and a fourth cover on the opposite side of the vertical plane,
   wherein the first cover and the fourth cover are configured to open independently of each other, and
   wherein the second cover and the third cover are configured to open independently of each other.

2. A nacelle according to claim 1, wherein the length of the arc of at least one bottom cover is arranged so that its free end lies under the nacelle when said at least one bottom cover is open.

3. A nacelle according to claim 1, wherein each bottom cover of the at least one bottom cover is hinged about a pivot axis lying in the vertical plane of symmetry.

4. A nacelle according to claim 1, wherein each top cover of the at least one top cover is hinged about a pivot axis that is disposed in the vertical plane of symmetry.

5. A nacelle according to claim 1, further comprising a lock configured to lock each top cover with the at least one bottom cover situated on the same side of the vertical plane of symmetry.

6. A nacelle according to claim 5, wherein the lock is provided on each of opposite sides of the aircraft turbojet nacelle.

7. A nacelle according to claim 5, wherein the lock is disposed above a bottom edge of the aircraft turbojet nacelle in each of the open position and the closed position.

8. A nacelle according to claim 1, further comprising actuators for opening and closing the at least one top cover, and wherein the at least one bottom cover is not coupled to actuators for opening and closing.

9. A nacelle according to claim 1, wherein a bottom cover of the at least one bottom cover is shielded.

10. A nacelle according to claim 9, wherein only the bottom cover is shielded.

11. A nacelle according to claim 9, wherein a shield of the shielded bottom cover extends radially about the at least one bottom cover.

12. An aircraft, the aircraft comprising:
   at least one aircraft turbojet nacelle according to claim 1,
   wherein the at least one bottom cover extends in arcuate shape from a fixed first end that is hinged to an opposite second end that is free,
   wherein, when the aircraft is standing on ground and the at least one bottom cover is in the open position, difference in height between the height of the fixed first end of said at least one bottom cover and the opposite second end is equal to a difference in height between said first fixed end and the ground.

13. A nacelle according to claim 1, wherein the first pivot axis and the second pivot axis are arranged in parallel and in a spaced relation on each side of the vertical plane.

14. A nacelle according to claim 1, wherein the third pivot axis and the fourth pivot axis are arranged in parallel and in a spaced relation on each side of the vertical plane.

15. An aircraft turbojet nacelle of elongate shape extending around and along a longitudinal central axis, the aircraft turbojet nacelle comprising:
   a cowling assembly pivotally movable between a closed position and an open position, the cowling assembly in the closed position defining an internal space that extends radially around the longitudinal central axis, and a transition from the closed position to the open position is obtained by moving the cowling assembly to give access to said internal space,
   wherein the cowling assembly comprises a pair of top covers and a pair of bottom covers, wherein each of the covers has an arcuate shape in cross section and extends partially around the longitudinal central axis, and the pair of top covers and the pair of bottom covers, while the cowling assembly is in the closed position, collectively extend around the internal space;
   wherein an arc length of the pair of bottom covers is shorter than an arc length of the pair of top covers;
   the pair of top covers includes a first cover and a second cover attached by a hinge aligned with a vertical plane extending through the longitudinal central axis; and
   the pair of bottom covers include a third cover and a fourth cover, wherein the third cover is attached to a third cover hinge parallel to and offset in a first direction from the vertical plane and the fourth cover is attached to a fourth cover hinge parallel to and offset in a second direction, opposite to the first direction, from the vertical plane.

* * * * *